United States Patent [19]

Min et al.

[11] Patent Number: 5,506,282
[45] Date of Patent: Apr. 9, 1996

[54] METHOD FOR PROVIDING MAXIMUM COATING FILM GLOSS

[75] Inventors: Lixing Min, Dresher; Michael D. Bowe, Newtown; Peter R. Sperry, Doylestown, all of Pa.

[73] Assignee: Rohm and Haas Company, Philadelphia, Pa.

[21] Appl. No.: 350,438

[22] Filed: Dec. 6, 1994

[51] Int. Cl.$^6$ .................................................. C08K 3/10
[52] U.S. Cl. ...................... 523/221; 524/522; 524/413; 427/385.5
[58] Field of Search ......................... 524/522, 413, 524/556; 427/385.5; 523/220, 221

[56] References Cited

U.S. PATENT DOCUMENTS

| | | | |
|---|---|---|---|
| 4,048,380 | 9/1977 | Blakey et al. | 524/522 |
| 4,255,308 | 3/1981 | Brasen | 524/522 |
| 4,325,856 | 4/1982 | Ishikawa et al. . | |
| 4,384,056 | 5/1983 | Schmidt et al. . | |
| 4,539,361 | 9/1985 | Siol et al. . | |
| 4,539,363 | 9/1985 | Backhouse | 524/522 |
| 4,654,397 | 3/1987 | Mueller-Mall et al. . | |
| 4,814,373 | 3/1989 | Frankel et al. . | |
| 5,084,505 | 1/1992 | Biale . | |
| 5,340,870 | 8/1994 | Clinnin et al. | 524/522 |

*Primary Examiner*—Jeffrey T. Smith
*Attorney, Agent, or Firm*—Ronald D. Bakule

[57] ABSTRACT

A method for achieving the maximum film gloss of a dried film of a waterborne coating composition, or paint, is provided. The waterborne coating composition contains a predominant pigment and two emulsion polymers, the three particulate components having certain relative amounts and size relationships to one another.

5 Claims, No Drawings

METHOD FOR PROVIDING MAXIMUM COATING FILM GLOSS

This invention relates to a method for providing the maximum film gloss of a dried waterborne coating composition.

Waterborne coating compositions such as paints containing emulsion-polymerized binders are frequently applied to substrates for decorative as well as protective reasons. A fundamental appearance parameter is the gloss of the dried coating. In many instances high gloss is required and this has been difficult to achieve with paints based on aqueous emulsion polymer binders.

U.S. Pat. No. 5,084,505 discloses a polymeric composition comprising a polymer and less than about 1 weight percent surfactant, the polymer having about 25 to about 60 weight percent of a soft monomer whose homopolymer has a Tg of less than about −20 C. and about 40 to about 75 weight percent of a hard monomer whose homopolymer has a Tg of greater than about 30 C. and has a calculated Tg of about 15 to about 35 C., an actual Tg of about 10 to about 60 C., and a particle size of less than about 250 nm. The polymeric composition is used in a high gloss latex paint.

The problem faced by the invention is the provision of a method for providing the maximum film gloss of dried waterborne coatings.

STATEMENT OF THE INVENTION

The invention provides a method for providing the maximum film gloss of a dried film of a waterborne coating composition by (a) forming a waterborne coating composition containing less than 30%, by volume based on the volume of the non-volatile components of the coating composition, of a predominant pigment; 30% to 80%, by volume based on the volume of the non-volatile components of the coating composition, of a first emulsion-polymerized addition polymer having a Tg from −30 C. to 50 C. and having an average particle diameter of 70% to 140% of the average particle size of the predominant pigment; 15% to 40%, by volume based on the volume of the non-volatile components of the coating composition, of a second emulsion-polymerized addition polymer having a Tg from −30 C. to 50 C. and having an average particle diameter of less than 35% of the average particle diameter of the predominant pigment; and pigment dispersant and surfactant in amounts effective to stabilize the coating composition; (b) applying the waterborne coating composition to a surface; and (c) drying the waterborne coating composition.

DETAILED DESCRIPTION

By "maximum film gloss" herein is meant that the specular gloss of a dried film of a waterborne coating composition measured at an incident angle of 20 degrees is equal to or greater than 90% of the maximum gloss calculated using the maximum achievable coating reflectance ($R_{max}$) as defined hereinbelow.

A "waterborne polymeric composition" herein is defined as a composition containing pigment, and a first and a second emulsion-polymerized addition polymer dispersed in an evaporable medium which is predominantly composed of water. The evaporable medium may contain, in addition to water, at least one water-miscible solvent such as, for example, isopropanol, propylene glycol, ethylene glycol methyl ether, ethylene glycol butyl ether, and propylene glycol propyl ether.

The waterborne coating composition contains less than 30%, by volume based on the volume of the coating composition, of a predominant pigment. The predominant pigment is selected from inorganic and organic pigments such as, for example, titanium dioxide, calcium carbonate, carbon black, iron oxide, chromium oxide, and phthalocyanine blue on the basis of color and opacity. Preferred is less than 20%, by volume based on the volume of the coating composition, of a predominant pigment. Preferred is titanium dioxide as the predominant pigment; lesser amounts of other pigments may be employed for various reasons such as, for example, tinting and corrosion protection.

The first and second emulsion-polymerized addition polymers in the waterborne polymeric composition may be prepared by the polymerization of at least one ethylenically unsaturated monomer such as, for example, esters of (meth)acrylic acid, vinyl esters, styrene, and butadiene. Polar monomers such as (meth)acrylic acid, itaconic acid, acrylonitrile, dimethylaminoethyl (meth)acrylate, and hydroxyethyl (meth)acrylate may also be incorporated in the polymer. Chain transfer agents such as, for example, mercaptans may be used in order to moderate the molecular weight of the polymer. The first and second emulsion-polymerized addition polymers may be composed of the same monomers or of different monomers as is desired.

The emulsion-polymerized polymers used in this invention are substantially thermoplastic, or substantially uncrosslinked, polymer when it is applied to the substrate, although low levels of deliberate or adventitious crosslinking may be present. When low levels of precrosslinking or gel content are desired low levels of multi-ethylenically unsaturated monomers such as, for example, 0.1%–5%, by weight based on the weight of the emulsion-polymerized polymer, allyl methacrylate, diallyl phthalate, 1,3-butylene glycol dimethacrylate, 1,6-hexanedioldiacrylate, and divinyl benzene may be used. It is important, however, that the quality of the film formation is not materially impaired. Post-film formation crosslinking of the emulsion-polymerized polymers used in this invention may be effected such as, for example, via ionic, oxidative, covalent coreactant, and UV or visible light means.

The polymerization techniques used to prepare such emulsion-polymerized addition polymers are well known in the art. Conventional surfactants may be used such as, for example, anionic and/or nonionic emulsifiers such as alkali or ammonium alkyl sulfates, alkyl sulfonic acids, fatty acids, and oxyethylated alkyl phenols. The amount of surfactant used is usually 0.1% to 6% by weight, based on the weight of total monomer. Either thermal or redox initiation processes may be used. Conventional free radical initiators may be used such as, for example, hydrogen peroxide, t-butyl hydroperoxide, and ammonium and/or alkali persulfates, typically at a level of 0.05% to 3.0% by weight, based on the weight of total monomer. Redox systems using the same initiators coupled with a suitable reductant such as, for example, isoascorbic acid and sodium bisulfite may be used at similar levels.

In another aspect of the present invention the first or second emulsion-polymerized addition polymers may be prepared by a multistage emulsion addition polymerization process, in which at least two stages differing in composition are polymerized in sequential fashion. Such a process usually results in the formation of at least two mutually incompatible polymer compositions, thereby resulting in the formation of at least two phases within the polymer particles. Such particles are composed of two or more phases of various geometries such as, for example, core/shell or core/sheath particles, core/shell particles with shell phases incompletely encapsulating the core, core/shell particles with a multiplicity of cores, and interpenetrating network particles. In all of these cases the majority of the surface area of the particle will be occupied by at least one outer phase and the interior of the particle will be occupied by at least one inner phase. Each of the stages of the multi-staged emulsion-polymerized polymer may contain the same monomers, chain transfer agents, etc. as disclosed hereinabove for the emulsion-polymerized addition polymer. The emulsion polymerization techniques used to prepare such dispersions are well known in the art such as, for example, U.S. Pat. Nos. 4,325,856; 4,654,397; and 4,814,373.

In another aspect of the present invention the first and second emulsion-polymerized addition polymers may be prepared in a single integrated process. Processes yielding polymodal particle size distributions such as those disclosed in U.S. Pat. Nos. 4,384,056 and 4,539,361, for example, may be employed.

The first emulsion-polymerized addition polymer has a calculated glass transition temperature, Tg, from −30 C. to 50 C. and an average particle diameter of 70% to 140% of the average particle diameter of the predominant pigment.

The second emulsion-polymerized addition polymer has a calculated glass transition temperature, Tg, from −30 C. to 50 C.; and an average particle diameter of less than 35% of the average particle diameter of the predominant pigment.

Glass transition temperatures (Tgs) herein are those calculated as a weight fraction-weighted average of the homopolymer Tg values, that is, for example, calculating the Tg of a copolymer of monomers M1 and M2, $$Tg(calc.)=w(M1) \times Tg(M1)+w(M2) \times Tg(M2)$$

,wherein

Tg(calc.) is the glass transition temperature calculated for the copolymer w(M1) is the weight fraction of monomer M1 in the copolymer w(M2) is the weight fraction of monomer M2 in the copolymer Tg(M1) is the glass transition temperature of the homopolymer of M1 Tg(M2) is the glass transition temperature of the homopolymer of M2

The glass transition temperature of homopolymers may be found, for example, in "Polymer Handbook", edited by J. Brandrup and E. H. Immergut, Interscience Publishers.

The waterborne coating composition is prepared by paint making techniques which are well known in the coatings art. First, the pigment(s) is well-dispersed in a waterborne medium under high shear such as is afforded by a COWLES (R) mixer. Then the first and second emulsion-polymerized addition polymers are added under low shear stirring along with other coatings adjuvants as desired. The waterborne coating composition may contain, in addition to the pigment(s) and the polymers, conventional coatings adjuvants such as, for example, emulsifiers, coalescing agents, curing agents, thickeners, humectants, wetting agents, biocides, plasticizers, antifoaming agents, colorants, waxes, and antioxidants.

For the purposes of this invention it is necessary to achieve a stable pigment dispersion, stable not only on formation and in storage, but also preferably stable during the drying of the coating composition. Preferred as dispersant is a copolymer of methacrylic acid with a methacrylate ester at a level in the grind of greater than 3% by weight based on pigment weight. Preferred as surfactant is an anionic surfactant at a level of 2% to 5% by weight, including the weight of the surfactant used in the preparation of the emulsion polymer, based on the total weight of the polymeric components of the coating composition.

The solids content of the waterborne coating composition may be from about 20% to about 50% by volume. The viscosity of the waterborne polymeric composition may be from about 50 centipoise to about 10,000 centipoise, as measured using a Brookfield viscometer (Model LVT using spindle #3 at 12 rpm); the viscosities appropriate for different application methods vary considerably.

The waterborne coating composition may be applied to a surface such as, for example, metal, wood, and plastic, using conventional coatings application methods such as, for example, brush, roller, drawdown, dipping, curtain coater, and spraying methods such as, for example, air-assisted spray, airless spray, high volume low pressure spray, and air-assisted electrostatic spray.

The waterborne coating composition which has been applied to a surface is then dried under ambient conditions or at elevated temperatures, as may be desired. The use of polymeric components with a Tg sufficiently below the drying temperature or, in the alternative, the use of levels of volatile coalescents or plasticizers effective to provide a film formation temperature sufficiently below the drying temperature, thereby effecting the formation of a continuous film, is well-known in the art. Preferred is drying under ambient conditions.

The gloss of a dried film of a coating composition is determined by measuring the specular gloss, as described in the Experimental Methods section herein-below. The measured gloss is a relative specular reflectance of the coating surface compared to that of a standard (as per ASTM D 523, an optically smooth black glass tile with a refractive index n=1.567 was used) with reflectances measured at incident angles of 20 degrees, 60 degrees, or 85 degrees, using the equation:

$$Gloss = Reflectance\ of\ Coating / Reflectance\ of\ Standard \times 100$$

The maximum achievable coating reflectance ($R_{max}$) herein is taken as related to the refractive index of the polymeric component(s), as calculated by the modified Fresnel equation:

$$R_{max}=\tfrac{1}{2}[\{[\cos i-(n^2-\sin^2 i)^{1/2}]/[\cos i+(n^2-\sin^2 i)^{1/2}]\}^2+\{[n^2 \cos i-(n^2-\sin^2 i)^{1/2}]/[n^2 \cos i+(n^2-\sin^2 i)^{1/2}]\}^2]$$

The maximum gloss ($G_{max}$) is calculated from $R_{max}$ using the following equation:

$$G_{max}=R_{max}/Reflectance\ of\ Standard \times 100$$

Experimental Methods

Measurement of Gloss

A drawdown of the test sample on glass was made with a 10 mil gap blade and dried at 25 C./50% Relative Humidity for 7 days. The specular gloss was measured using a GLOSSGARD II Glossmeter (Hunter Associates Laboratory, Inc.) as per ASTM D 523-89 at one of three angles of reflection, i.e., 20, 60, or 85 degrees.

Measurement of Refractive Index

The refractive index of polymer films at 25° C. and 589 nm wavelength (Na D-line) was measured with an Abbe refractometer, (Bausch & Lomb Model 3L or AO Scientific Instruments Mark II models), according to the instructions provided by the manufacturer for the measurement of solid samples. The use of the Abbe refractometer for determinations on polymer films is further described in Encyclopedia of Polymer Science and Engineering, Volume 14, p. 269, Wiley-Interscience, 1988. ASTM D 542-90 also provides procedures for preparation of test specimens and measurement technique with the Abbe refractometer, especially for harder organic polymer compositions. For soft, flexible polymer films, sufficient optical contact with the refracting prism was achieved by simply pressing a rectangular piece of the film, somewhat smaller than the prism, directly against it. For harder films, optical contact with the prism was achieved by first placing a small drop of an optical contact liquid on the prism, or, if the film was thin enough, by placing contact liquid on both sides of the film and closing the hinged prism assembly on the film. A nonsolvent optical contact fluid, as described in Chamot and Mason, Handbook of Chemical Microscopy, 3rd edition, p. 327, John Wiley & Sons, 1958 was used in this work, a glycerol solution of potassium mercuric iodide, which had a refractive index, $n_D^{25}=1.65$.

Measurement of Particle Size

Particle sizes of the latex and the predominant pigment were measured using either the BI-90 or CHDF instruments. Particle sizes may be determined using a Brookhaven BI-90 Particle Sizer which employs a light scattering technique. CHDF measurements of particle diameter were performed using a Matec Applied Sciences CHDF 1100 instrument using samples at 0.5 to 5.0% solids content. Both the emulsion polymers and the predominant pigment are measured using the same instrument.

EXAMPLE 1.

Preparation and gloss evaluation of waterborne coating composition.

Preparation of first emulsion-polymerized addition polymer (Sample 1-1)

In a first stage, the kettle water/soap were heated to 85° C. with stirring under $N_2$. The Monomer Emulsion ("M.E.") preform and rinse were added. After two minutes the kettle ammonium persulfate (APS) was added. Eighteen minutes later the M.E. addition was begun at a rate to feed over 160 min, and Initiator solution ("Init.") to feed over 180 min. When M.E. was in, the feed line was rinsed. When Init. addition was completed, the reaction mixture was held at 85° C. for 30 min. The reaction mixture was cooled and filtered through a 100 mesh screen.

TABLE 1-1

| Ingredients for first stage polymerization | | | |
|---|---|---|---|
| Kettle charge (g) | Monomer | Emulsion | Initiator |
| H₂O 530 | H₂O | 165 | APS/water |
| CO-436 (61.5%) 6.9 | CO-436 | 2.1 | 1.4/70 |
|  | EHA | 252 |  |
| M.E. preform 44 | STY | 420 |  |
| (rinse) 10 | MAA | 28 |  |
| APS/water 0.7/14 | rinse | 30 | T.S.: 45.5% |
| Na₂CO₃/water 2.8/28 |  |  |  |

In a second stage, the kettle water was heated to 85° C. with stirring under Nitrogen. The First Stage polymer and rinse were added. After 2 minutes the M.E. was begun at a rate to feed over 160 min, and theInit. to feed over 180 min. When M.E. addition was complete, the feed line was rinsed. When the Init. feed was complete, the reaction mixture was held at 85° C. for 30 min. The reaction mixture was cooled, pH adjusted to 8.5 with NH₃; and filtered through a 100 mesh screen. Particle diameter was 298 nanometers.

TABLE 1-2

| Ingredients for second stage polymerization | | | |
|---|---|---|---|
| Kettle (g) | Monomer | Emulsion | Initiator |
| H₂O 510 | H₂O | 165 | APS/water |
|  | CO-436 | 2.1 | 1.4/70 |
| First stage (20 g solid) (~45) | EHA | 252 |  |
| (rinse) 10 | STY | 420 |  |
|  | MAA | 28 |  |
|  | rinse | 30 |  |

Preparation of second emulsion-polymerized addition polymer (Sample 1-2)

The kettle water/soap were heated to 85° C. with stirring under $N_2$. The kettle ammonium persulfate (APS) was added. Two minutes later the M.E. addition was begun at a rate to feed over 120 min, and Init. to feed over 140 min. When M.E. addition was completed, the feed line was rinsed. When Init. addition was completed, the reaction mixture was held at 85° C. for 30 min. The reaction mixture was cooled, the pH adjusted to 8.5 with ammonia, and then filtered through a 100 mesh screen. Particle diameter was 54 nanometers.

TABLE 1-3

| Ingredients for polymerization of sample 1–2. | | | |
|---|---|---|---|
| Kettle (g) | Monomer | Emulsion | Initiator |
| H₂O 1000 | H₂O | 165 | APS/water |
| CO-436 (61.5%) 20.9 | CO-436 | 2.3 | 1.4/70 |
|  | EHA | 252 |  |
| APS/water 0.7/15 | STY | 420 |  |
|  | MAA | 28 |  |
|  | rinse | 30 |  |

A series of styrene/acrylic emulsion polymer binder paints were prepared at 18 PVC using Titanium Dioxide (TI-PURE R-700 from DuPont) of 285 nanometer particle diameter as the predominant pigment, according to the formulation given in Table 1-4. Additional soap was added slowly to the latex with stirring. Sample 1-1 was used at a level of 70% based on the volume of the dry addition polymers. Sample 1-2 was used at a level of 30% based on the volume of the dry addition polymers. The results are presented in Table 1-5.

TABLE 1-4

| Preparation of coating compositions<br>The following materials were combined and ground in a<br>Cowles mill at high speed for 15 minutes. (All quantities are in grams) | |
|---|---|
| Propylene Glycol | 1.8 |
| Anionic Dispersant (35% solids) | 2.14 |
| (TAMOL QR-681M) |  |
| Aqueous Ammonia (28%) | 0.05 |
| Diethyleneglycol methyl ether | 1.0 |
| Defoamer | 0.25 |
| (BYK 022) |  |
| Urethane rheology modifier (20% sollids) | 1.76 |
| (ACRYSOL RM-1020) |  |
| Titanium dioxide | 15.26 |
| (TI-PURE R-700) |  |
| To the grind were added the following, in order, with slow stirring: | |
| Polymeric binder (blend) | 44.37 |
| TEXANOL | 3.77 |
| Defoamer | 0.15 |
| (BYK 022) |  |
| Urethane rheology modifier (20% solids) | 2.08 |
| (ACRYSOL RM-1020) |  |
| Water | 1.66 |

The aqueous coating composition was allowed to equilibrate overnight.

TABLE 1-5

| Effect of soap level on dried film gloss | | |
|---|---|---|
| Composition | Anionic Soap Level<br>(wt. based on polymer wt.) | Gloss (20/60) |
| 1-1 | 0.7% | 65/94 |

TABLE 1-5-continued

Effect of soap level on dried film gloss

| Composition | Anionic Soap Level (wt. based on polymer wt.) | Gloss (20/60) |
|---|---|---|
| 1-2 | 3.0% | 86/98 |
| 1-3 | 5.0% | 89/99 |
| $G_{max} = 94/97$ | | |

Dried films of the waterborne compositions 1-2 and 1-3 of this invention exhibit maximum film gloss.

EXAMPLE 2

Effect of particle diameter of first emulsion polymer and particle diameter of second emulsion polymer on dried film gloss A series of styrene/acrylic emulsion polymer binder paints were prepared at 18 PVC using Titanium Dioxide (TI-PURE R-700) of 285 nanometer particle diameter as the predominant pigment. The second emulsion-polymerized addition polymer had a particle diameter of 55 nanometers and was used at 25% based on the volume of the coating composition. The anionic surfactant level was used at 5% (by weight bsed on the weight of polymer solids). Various first emulsion-polymerized addition polymer diameters used at 57% based on the volume of the coating composition were evaluated as shown in Table 2-1.

TABLE 2.1

Effect of first emulsion polymer particle diameter

| Composition | Particle diameter (nanometers) | 20 degree Gloss |
|---|---|---|
| 2-1 | 250 | 76 |
| 2-2 | 260 | 76 |
| 2-3 | 290 | 76 |
| 2-4 | 310 | 78 |
| 2-5 | 320 | 80 |
| 2-6 | 360 | 81 |
| 2-7 | 405 | 73 |
| 2-8 | 445 | 73 |
| G max | | 85 |

A series of styrene/acrylic emulsion polymer binder paints were prepared at 18 PVC using Titanium Dioxide (TI-PURE R-700) of 285 nanometer particle diameter as the predominant pigment. The first emulsion-polymerized addition polymer had a particle diameter of 356 nanometers and was used at 57% based on the volume of the coating composition. The anionic surfactant level was used at 5% (by weight bsed on the weight of polymer solids). Various second emulsion-polymerized addition polymer diameters (the volume % of this polymer was used at 25% based on the volume of the coating composition) were evaluated as shown in Table 2-2.

TABLE 2.2

Effect of second emulsion polymer particle diameter

| Composition | Particle diameter (nanometers) | 20 degree Gloss |
|---|---|---|
| 2-9 | 43 | 81 |
| 2-10 | 55 | 81 |
| 2-11 | 70 | 82 |
| 2-12 | 100 | 74 |
| $G_{max}$ | | 85 |

Dried films of the waterborne compositions of this invention 2-1 to 2-6 and 2-9 to 2-11 of this invention exhibit maximum film gloss.

EXAMPLE 3

Effect of anionic surfactant level on dried film gloss

A series of styrene/acrylic emulsion polymer binder paints were prepared at 18 PVC using Titanium Dioxide (TI-PURE R-700) of 285 nanometer particle diameter as the predominant pigment. The first emulsion-polymerized addition polymer had a particle diameter of 356 nanometers and the volume % was 57% based on the volume of the coating composition. The second emulsion-polymerized addition polymer had a particle diameter of 55 nanometers and the volume % was 25% based on the volume of the coating composition. The anionic surfactant (ALIPAL CO-436) levels are given as weight % based on polymer weight. Results of evaluation are presented in Table 3-1.

TABLE 3-1

Effect of anionic surfactant level on dried film gloss

| Composition | Soap Level | 20 degree Gloss |
|---|---|---|
| 3-1 | 0.7 | 56 |
| 3-2 | 1.7 | 64 |
| 3-3 | 2.7 | 71 |
| 3-4 | 3.7 | 77 |
| 3-5 | 4.7 | 83 |
| $G_{max}$ | | 85 |

Dried films of the waterborne compositions of this invention 3-4 and 3-5 of this invention exhibit maximum film gloss.

EXAMPLE 4

Effect of dispersant level on dried film gloss

A series of styrene/acrylic emulsion polymer binder paints were prepared at 18 PVC using Titanium Dioxide (TI-PURE R-700) of 285 nanometer particle diameter as the predominant pigment. The first emulsion-polymerized addition polymer had a particle diameter of 276 nanometers and its volume % was 66% based on the volume of the coating composition. The second emulsion-polymerized addition polymer had a particle diameter of 53 nanometers and its volume % was 16% based on the volume of the coating composition. The copolymer of methacrylic acid with a methacrylate ester dispersant (TAMOL 681) levels, all used in the pigment grind, are given as weight % based on pigment weight. Results of evaluation are presented in Table 4-1.

TABLE 4-1

Effect of dispersant level on dried film gloss

| Composition | Dispersant Level | 20 degree Gloss |
|---|---|---|
| 4-1 | 0.7 | 58 |
| 4-2 | 3.0 | 70 |
| 4-3 | 5.0 | 83 |
| $G_{max}$ | | 85 |

Dried film of the waterborne composition of this invention 4-3 exhibits maximum film gloss.

EXAMPLE 5

Effect of second emulsion polymer level on dried film gloss

A series of styrene/acrylic emulsion polymer binder paints were prepared at 18 PVC using Titanium Dioxide (TI-PURE R-700) of 285 nanometer particle diameter as the predominant pigment. The first emulsion-polymerized addition polymer had a particle diameter of 322 nanometers and its volume % was (82-x) % based on the volume of the coating composition. The second emulsion-polymerized addition polymer had a particle diameter of 55 nanometers and its volume % was x % based on the volume of the coating composition. Results of evaluation are presented in Table 5-1.

TABLE 5-1

Effect of second emulsion polymer level on dried film gloss

| Composition | x % | 20 degree Gloss |
|---|---|---|
| 5-1 | 0 | 63 |
| 5-2 | 8 | 66 |
| 5-3 | 16 | 75 |
| 5-4 | 25 | 77 |
| 5-5 | 41 | 76 |
| 5-6 | 82 | 70 |
| $G_{max}$ | | 85 |

Dried film of the waterborne composition of this invention 5-4 exhibits maximum film gloss.

EXAMPLE 6

Effect of high Tg second emulsion polymer level on dried film gloss

A series of styrene/acrylic emulsion polymer binder paints were prepared at 18 PVC using Titanium Dioxide (TI-PURE R-700) of 285 nanometer particle diameter as the predominant pigment. The first emulsion-polymerized addition polymer had a particle diameter of 356 nanometers and its volume % was 57% based on the volume of the coating composition. The second emulsion-polymerized addition polymer was a blend of second emulsion polymer 1, which had a particle diameter of 40 nanometers, a Tg of 10 C., and its volume % was (25-x) % based on the volume of the coating composition, and second emulsion polymer 2, which had a particle diameter of 65 nanometers, a Tg of 84 C., and its volume % was x % based on the volume of the coating composition. Results of evaluation are presented in Table 6-1.

TABLE 6-1

Effect of second emulsion polymer 2 level on dried film gloss

| Composition | x % | 20 degree Gloss |
|---|---|---|
| 6-1 | 0 | 76 |
| 6-2 | 6.2 | 75 |
| 6-3 | 12.3 | 59 |
| 6-4 | 24.6 | 41 |
| $G_{max}$ | | 83 |

Dried films of the waterborne compositions of this invention 6-1 and 6-2 exhibit maximum film gloss. Compositions 6-3 and 6-4 contain higher levels of second emulsion polymer 2 which reduce the level of second emulsion-polymerized addition polymer 1 having a Tg from −30 C. to 50 C. and having an average particle diameter of less than 35% of the average particle diameter of the predominant pigment to less than 15% to 40%, by volume based on the volume of the non-volatile components of said coating composition do not exhibit maximum film gloss.

EXAMPLE 7

Effect of PVC level on dried film gloss

A series of styrene/acrylic emulsion polymer binder paints were prepared at various PVCs using Titanium Dioxide (TI-PURE R-700) of 285 nanometer particle diameter as the predominant pigment. The first emulsion-polymerized addition polymer had a particle diameter of 356 nanometers and its volume % was (75-x) % based on the volume of the coating composition. The second emulsion-polymerized addition polymer had a particle diameter of 55 nanometers and its volume % was 25% based on the volume of the coating composition. Anionic soap level was 5 weight % based on polymer weight. Results of evaluation are presented in Table 7-1.

TABLE 7

Effect of PVC level on dried film gloss measured at 20 degrees

| PVC | % of Gmax |
|---|---|
| 0 | 100 |
| 10 | 100 |
| 20 | 99 |
| 30 | 65 |
| 40 | 20 |

Dried films of a waterborne composition of this invention at 0, 10, and 20 PVC exhibit maximum film gloss.

What is claimed is:

1. A method for providing maximum film gloss of a dried film of a waterborne coating composition comprising
   (a) forming a waterborne coating composition comprising:
      less than 30%, by volume based on the volume of the non-volatile components of said coating composition, of a predominant pigment,
      30% to 80%, by volume based on the volume of the non-volatile components of said coating composition, of a first emulsion-polymerized addition polymer having a Tg from −30 C. to 50 C. and having an average particle diameter of 70% to 140% of the average particle diameter of said predominant pigment,
      15% to 40%, by volume based on the volume of the non-volatile components of said coating composition, of a second emulsion-polymerized addition polymer having a Tg from −30 C. to 50 C. and having an average particle diameter of less than 35% of the average particle diameter of said predominant pigment,
      and pigment dispersant and surfactant in amounts effective to stabilize said composition;
   (b) applying said waterborne coating composition to a surface; and
   (c) drying said waterborne coating composition.

2. The method of claim 1 wherein said predominant pigment is titanium dioxide.

3. The method of claim 1 wherein said waterborne coating composition comprises less than 20%, by volume based on the volume of the non-volatile components of said coating composition, of titanium dioxide.

4. The method of claim 3 wherein said pigment dispersant is a copolymer of (meth)acrylic acid and at least one (meth)acrylate ester used at a level of greater than 3%, by weight based on pigment weight, and wherein said surfactant is an anionic surfactant used at a level of 2% to 5%, by weight based on total polymer weight.

5. A surface bearing a dried film of a waterborne coating composition, said film having maximum film gloss, said composition comprising less than 30%, by volume based on the volume of the non-volatile components of said coating composition, of a predominant pigment; 30% to 80%, by volume based on the volume of the non-volatile components of said coating composition, of a first emulsion-polymerized addition polymer having a Tg from −30 C. to 50 C. and having an average particle diameter of 70% to 140% of the average particle diameter of said predominant pigment; 15% to 40%, by volume based on the volume of the non-volatile components of said coating composition, of a second emulsion-polymerized addition polymer having a Tg from −30 C. to 50 C. and having an average particle diameter of less than 35% of the average particle diameter of said predominant pigment; and pigment dispersant and surfactant in amounts effective to stabilize said composition.

\* \* \* \* \*